(12) United States Patent
Gerebe et al.

(10) Patent No.: US 10,997,283 B2
(45) Date of Patent: *May 4, 2021

(54) SYSTEM FOR SECURING SOFTWARE CONTAINERS WITH ENCRYPTION AND EMBEDDED AGENT

(71) Applicants: Amir Gerebe, Givatayim (IL); Rani Osnat, Tel Aviv (IL)

(72) Inventors: Amir Gerebe, Givatayim (IL); Rani Osnat, Tel Aviv (IL)

(73) Assignee: AQUA SECURITY SOFTWARE, LTD., Ramat Gan (IL)

( * ) Notice: Subject to any disclaimer, the term of this patent is extended or adjusted under 35 U.S.C. 154(b) by 435 days.

This patent is subject to a terminal disclaimer.

(21) Appl. No.: 15/864,116

(22) Filed: Jan. 8, 2018

(65) Prior Publication Data

US 2019/0213319 A1 Jul. 11, 2019

(51) Int. Cl.
G06F 21/44 (2013.01)
H04L 9/32 (2006.01)
H04L 29/06 (2006.01)
G06F 21/56 (2013.01)

(52) U.S. Cl.
CPC ............ G06F 21/44 (2013.01); G06F 21/565 (2013.01); H04L 9/3226 (2013.01); H04L 63/08 (2013.01); H04L 63/20 (2013.01)

(58) Field of Classification Search
CPC ..... G06F 21/44; G06F 21/565; H04L 9/3226; H04L 63/08; H04L 63/20
USPC ....................................................... 713/189
See application file for complete search history.

(56) References Cited

U.S. PATENT DOCUMENTS

| 8,189,919 | B2 * | 5/2012 | Lee ........................ H04N 5/781 382/182 |
| 8,539,073 | B1 * | 9/2013 | Dayan ................... G06F 9/4843 709/225 |
| 9,246,686 | B1 * | 1/2016 | Holland ................. H04L 9/3236 |
| 9,503,482 | B1 * | 11/2016 | Hugenbruch ........... H04L 63/20 |
| 10,055,578 | B1 * | 8/2018 | Marquardt .............. H04L 63/14 |
| 2001/0013064 | A1 * | 8/2001 | Cox .......................... G06F 8/61 709/220 |
| 2003/0061487 | A1 * | 3/2003 | Angelo ................. G06F 21/565 713/176 |
| 2006/0273151 | A1 * | 12/2006 | Block ..................... G07F 19/20 235/379 |
| 2008/0072066 | A1 * | 3/2008 | Vogler .................... G06F 21/31 713/187 |
| 2008/0148402 | A1 * | 6/2008 | Bogineni ............ H04L 63/0428 726/22 |

(Continued)

*Primary Examiner* — Shahriar Zarrineh
(74) *Attorney, Agent, or Firm* — Carlson, Gaskey & Olds, P.C.

(57) ABSTRACT

A computer-implemented method of providing security for a software container according to an example of the present disclosure includes receiving a software container image having a software application layer that is encrypted and includes a software application, and having a separate security agent layer that includes a security agent. The method includes receiving a request to instantiate the software container image as a software container. The method also includes, based on the request: launching the security agent and utilizing the security agent to decrypt and authenticate the software application layer, and control operation of the software application based on the authentication.

11 Claims, 5 Drawing Sheets

(56) References Cited

U.S. PATENT DOCUMENTS

| | | | |
|---|---|---|---|
| 2009/0287831 A1* | 11/2009 | Nakagawa | H04L 63/08 709/228 |
| 2010/0132016 A1* | 5/2010 | Ferris | G06F 21/6218 726/4 |
| 2011/0009107 A1* | 1/2011 | Guba | H04W 4/027 455/418 |
| 2013/0081104 A1* | 3/2013 | Jung | G06F 21/629 726/1 |
| 2014/0122875 A1* | 5/2014 | Pizi | G06F 21/6209 713/164 |
| 2014/0137184 A1* | 5/2014 | Russello | G06F 21/60 726/1 |
| 2014/0189777 A1* | 7/2014 | Viswanathan | H04L 63/105 726/1 |
| 2015/0150025 A1* | 5/2015 | Yuen | G06F 21/556 719/312 |
| 2015/0169852 A1* | 6/2015 | Lange | G06F 21/121 726/1 |
| 2015/0379287 A1* | 12/2015 | Mathur | G06F 21/602 726/27 |
| 2016/0171250 A1* | 6/2016 | Boivie | G06F 21/6209 713/189 |
| 2016/0292431 A1* | 10/2016 | Sreekanti | G06F 21/602 |
| 2016/0342786 A1* | 11/2016 | Gerebe | G06F 21/52 |
| 2016/0381075 A1* | 12/2016 | Goyal | H04L 63/105 713/176 |
| 2017/0116415 A1* | 4/2017 | Stopel | G06F 21/53 |
| 2017/0118249 A1* | 4/2017 | Motukuru | H04L 63/102 |
| 2017/0168778 A1* | 6/2017 | Brandys | G06F 9/455 |
| 2017/0177860 A1* | 6/2017 | Suarez | G06F 21/53 |
| 2017/0177877 A1* | 6/2017 | Suarez | G06F 16/188 |
| 2017/0180346 A1* | 6/2017 | Suarez | G06F 8/71 |
| 2017/0300697 A1* | 10/2017 | Iyer | G06F 21/577 |
| 2017/0329588 A1* | 11/2017 | Lundberg | G06F 8/70 |
| 2017/0372045 A1* | 12/2017 | Dondl | G06F 21/121 |
| 2018/0027022 A1* | 1/2018 | Nagaratnam | H04L 63/20 726/1 |
| 2018/0103064 A1* | 4/2018 | Ahuja | H04L 63/20 |
| 2018/0157516 A1* | 6/2018 | Kristiansson | G06F 9/5055 |
| 2018/0234450 A1* | 8/2018 | Li | H04L 63/1433 |
| 2018/0260566 A1* | 9/2018 | Chaganti | G06F 21/577 |
| 2019/0036678 A1* | 1/2019 | Ahmed | H04L 9/083 |
| 2019/0156023 A1* | 5/2019 | Gerebe | G06F 21/54 |
| 2019/0190931 A1* | 6/2019 | Levin | H04L 9/3263 |
| 2019/0354690 A1* | 11/2019 | Brigandi | G06F 21/57 |
| 2019/0394302 A1* | 12/2019 | Kristiansson | H04L 67/104 |

* cited by examiner

SYSTEM FOR SECURING SOFTWARE CONTAINERS WITH ENCRYPTION AND EMBEDDED AGENT

BACKGROUND

This application relates to software containers, and more particularly to security features for software containers.

Virtual machines have gained popularity for a variety of computing tasks. A virtual machine is a software implementation of a physical machine that executes programs like a physical machine. A typical virtual machine includes an entire additional operating system that runs on top of a host operating system, and one or more applications that run within that additional operating system. Virtual machines enable administrators to run several operating system instances at the same time on a single server. A specialized application called a hypervisor manages the virtual machines that run on a given server. Running multiple operating system instances on a single physical machine, however, is resource-intensive.

More recently, software containers are being used as an alternative to running multiple virtual machines. Software containers allow administrators to virtualize a single application, or group of applications, rather than an entire operating system. A software container includes a software application plus dependencies required to run the application bundled into one package. The dependencies may include libraries, binaries, and/or configuration files, for example. By containerizing the application and its dependencies, differences in operating system distributions and underlying infrastructure are abstracted away, making it easy to migrate an application between various environments (e.g., development, testing, and production).

Multiple software containers can be run in isolation from each other on a single host operating system, which provides an alternative to running multiple virtual machines and their accompanying operating systems on a single server. Because software containers allow an administrator to virtualize a single application rather than an entire operating system, running a given quantity of software containers is less resource intensive than running the same quantity of virtual machines. One platform for building and running software containers is DOCKER.

Software containers are instantiated from software container images which include a collection of files that are grouped into one or more layers, and also include a manifest that identifies the one or more layers. In some container environments, a given layer can be linked to many software container images while only being stored once in memory. If a user modifies a layer of a software container image without authorization, a software container instantiated from the software container image may not function properly, and may even become infected with malware.

SUMMARY

A computer-implemented method of providing security for a software container according to an example of the present disclosure includes receiving a software container image that has a software application layer that is encrypted and includes a software application. The software container image has a separate security agent layer that includes a security agent. A request is received to instantiate the software container image as a software container. Based on the request, the security agent is launched and is utilized to decrypt and authenticate the software application layer, and to control operation of the software application based on the authentication.

A computer-implemented method of providing security for a software container image according to an example of the present disclosure includes obtaining a software container image that includes at least one lower layer that stores a software application, and includes an execution entry point configured to launch to the software application upon instantiation of the software container image. The at least one lower layer is encrypted to obtain at least one encrypted layer. An encrypted container image is generated that replaces the at least one lower layer with the at least one encrypted layer. A security agent is embedded within the encrypted software container image. The security agent is configured to control operation of the software application when the encrypted software container image is instantiated as a software container based on a security policy and a cryptographic fingerprint of the at least one lower layer. The execution entry point of the encrypted software container image is configured to launch the security agent instead of the software application upon instantiation of the encrypted software container image.

A computing device according to an example of the present disclosure includes memory configured to store a software container image that has a software application layer that is encrypted and includes a software application. The software container image has a separate security agent layer that includes a security agent. A processor is operatively connected to the memory and is configured to receive a request to instantiate the software container image as a software container. Based on the request, the processor is configured to launch the security agent and utilize the security agent to decrypt and authenticate the software application layer, and control operation of the software application based on the authentication.

A computing device according to an example of the present disclosure includes memory configured to store a software container image that includes at least one lower layer that stores a software application, and includes an execution entry point configured to launch the software application upon instantiation of the software container image. A processor is operatively connected to the memory and is configured to encrypt the at least one lower layer to obtain at least one encrypted layer, and generate an encrypted software container image that replaces the at least one lower layer with the at least one encrypted layer. The processor is configured to embed a security agent within the encrypted software container image. The security agent is configured to control operation of the software application when the encrypted software container image is instantiated as a software container based on a security policy and a cryptographic fingerprint of the at least one lower layer. The processor is configured to configure the execution entry point of the encrypted software container image to launch the security agent instead of the software application upon instantiation of the encrypted software container image.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
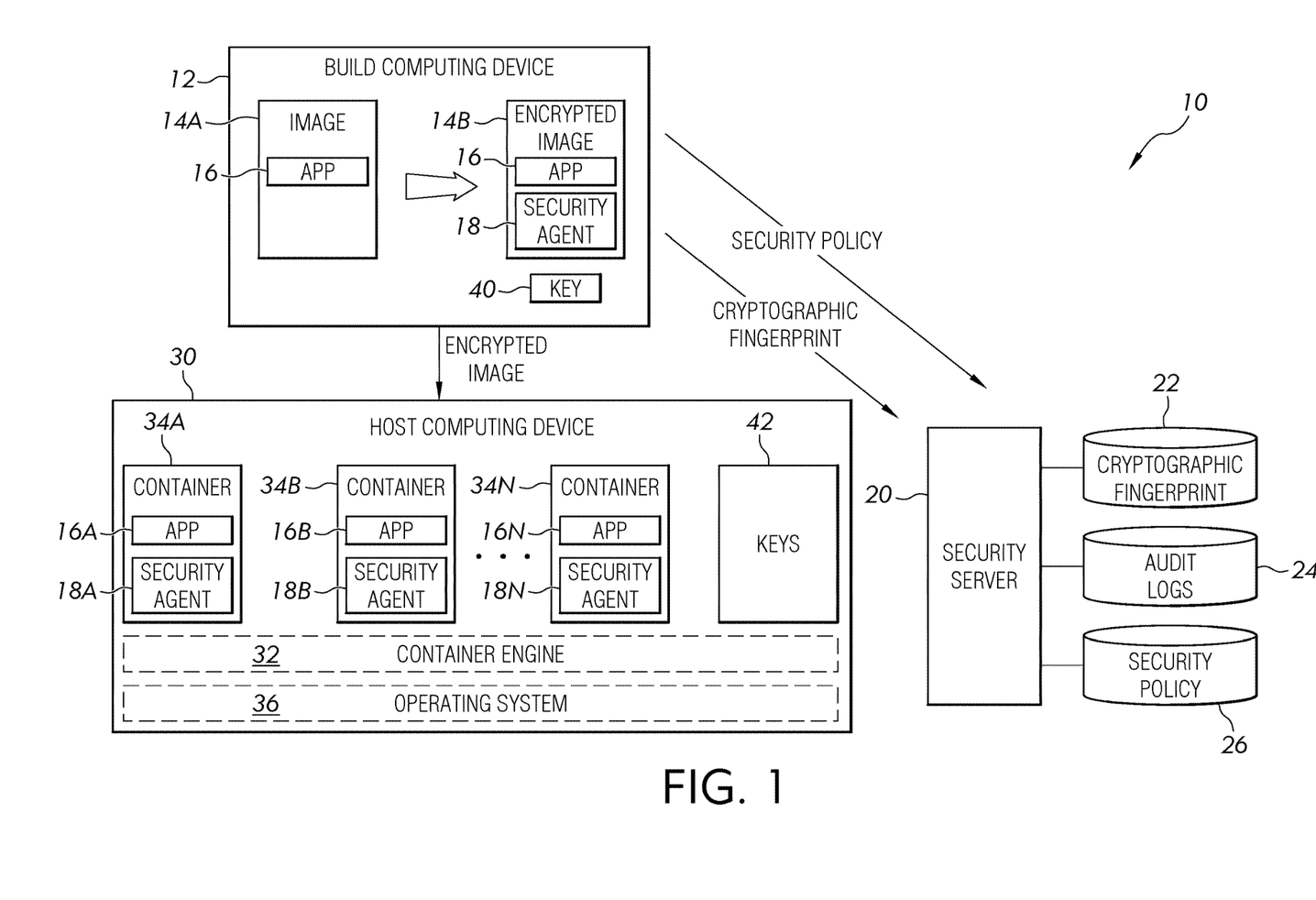
FIG. 1 schematically illustrates a system that provides security for software containers.

FIG. 1 schematically illustrates a system 10 for providing security for software containers. The system 10 includes a build computing device 12, a security server 20, and a host computing device 30.

The build computing device 12 obtains a software container image 14A that includes a software application 16, encrypts the software application 16, and generates an encrypted software container image 14B that includes the encrypted version of the software application 16 and also includes an embedded security agent 18. The build computing device 12 provides a security policy and a cryptographic fingerprint of the software application 16 to the security server 20, and deploys the encrypted software container image 14B to the host computing device 30.

The host computing device 30 uses a container engine 32 to instantiate the software container image 14B as a container 34 and launch the security agent 18. For the discussion below, assume that the encrypted software container image 14B is instantiated as software container 34A. The security agent 18 utilizes a cryptographic key from cryptographic key repository 42 to decrypt the encrypted software application 16. The embedded security agent 18 provides for an authentication of the encrypted software container image 14B based on the previous cryptographic fingerprint, and provides for control of runtime operation of the software application 16 of the encrypted software container image 14B based on the security policy.

The embedded security agent 18 provides visibility into software container 34 activity, and provides for enforcement of the security policy, which can include the ability to stop, from within the instantiated software container 34, unauthorized network connections, file access, or user access. When it is launched, the security agent 18 is aware that it is deployed inside of an instantiated software container 34, is aware of the identity of the instantiated software container 34, and can therefore apply appropriate controls based on that identity.

Figure 2A:
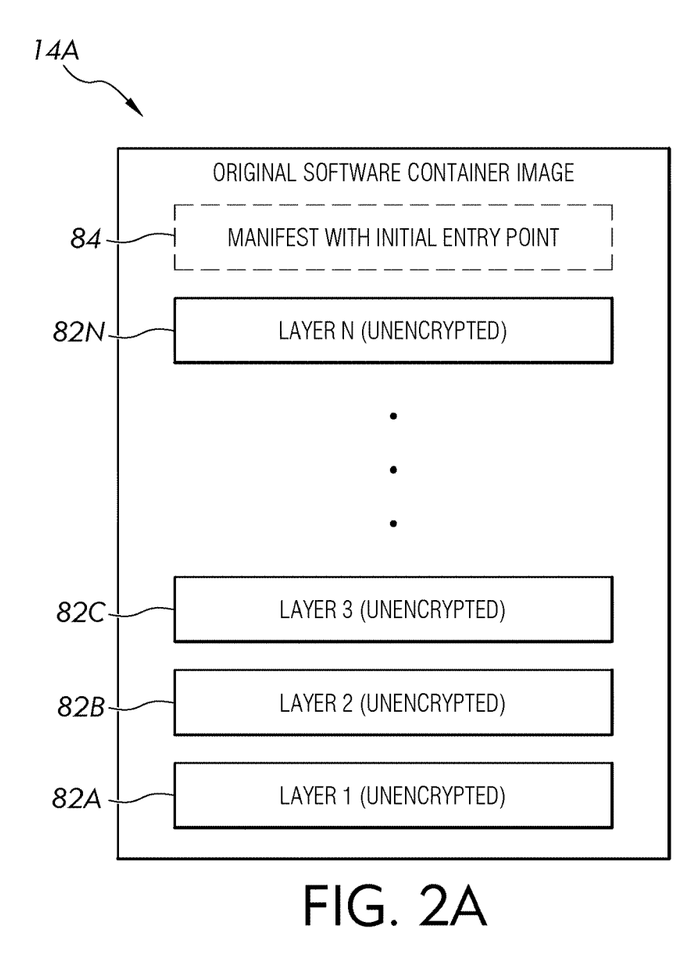
FIG. 2A schematically illustrates an example original software container image that includes a plurality of unencrypted layers.

FIG. 2A schematically illustrate an example original software container image 14A prior to encryption of the software application. The software container image 14A includes a manifest 84 and a plurality of unencrypted lower layers 82A-N. One or more of the layers 82 are software application layers that provide the software application 16. The manifest 84 describes the unencrypted layers 82 and their file contents. The manifest 84 includes an entry point that instructs the container engine 32 what file to launch from the unencrypted layers 82A-N when the software container image 14A is instantiated as a container 34. Initially, the entry point points to a file in one of the unencrypted layers 82A-N.

Figure 2B:
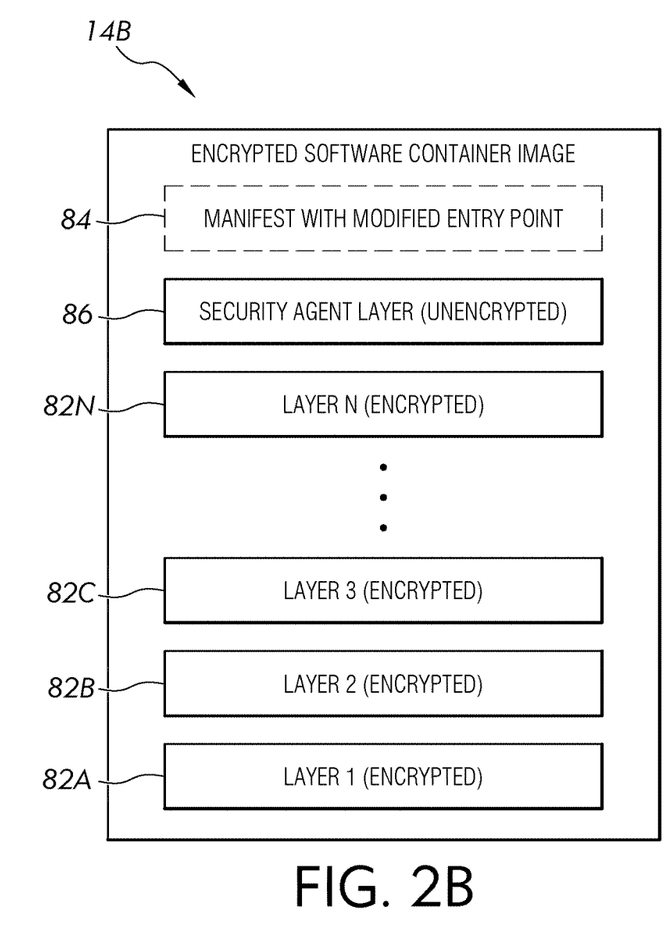
FIG. 2B schematically illustrates an example encrypted software container image that includes a plurality of encrypted layers.

FIG. 2B schematically illustrates an encrypted software container image 14B that includes corresponding encrypted versions of the layers 82A-N of the original software container image 14A. The encrypted software container image 14B also includes an unencrypted security agent layer 86 that includes the security agent 18, and includes an updated version of the manifest 84 that has a modified entry point that points to the security agent 18 in the security agent layer 86 instead of pointing to a file in one of the layers 82A-N.

As used herein, an "encrypted software container image" includes some or all of its lower layers 82 in encrypted form, but does not need to be encrypted in its entirety. In FIG. 2B, for example, the security agent layer 86 and manifest 84 of the encrypted software container image 14B are unencrypted. The encrypted software container image 14B that is generated can be a new software container image created based on the software container image 14A, or can be a modified version of the original software container image 14A, for example (e.g., one that overwrites portions of the original software container image 14A).

Although a plurality of layers 82A-N are shown in FIGS. 2A-B, it is understood that more or fewer lower layers 82 could be used (e.g., 1 lower layer, 2 lower layers, 3 lower layers, etc.). Reference numeral 14A is generically used below to refer to a software container image prior to encryption of its lower layers 82 and that lacks the security agent 18. The reference numeral 14B is generically used to refer to a software container image that includes the security agent 18 and includes one or more of its lower layer 82 in encrypted form.

Figure 3A:
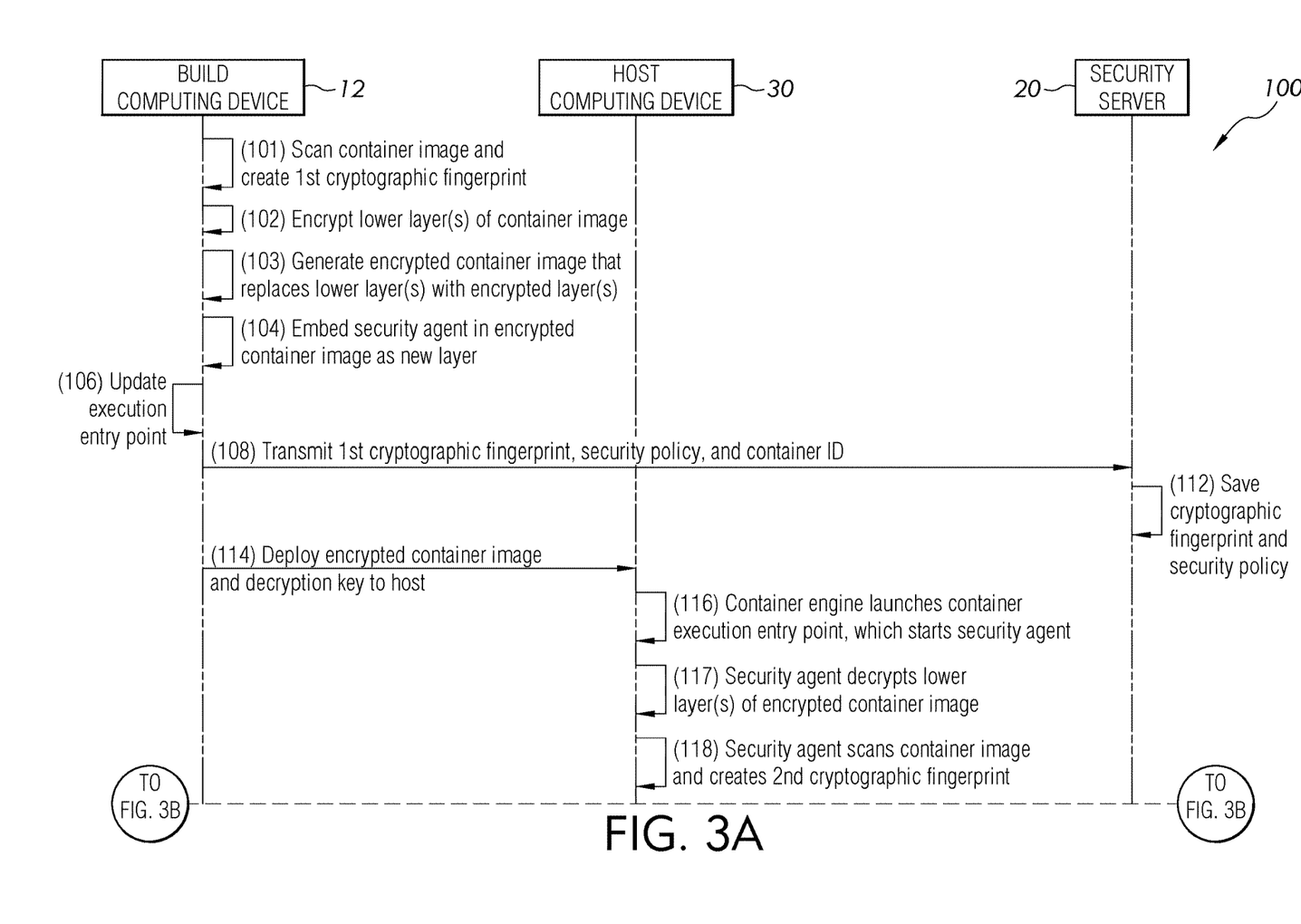
FIGS. 3A-B are representative of an example method of operating the system of FIG. 1.
Figure 3B:
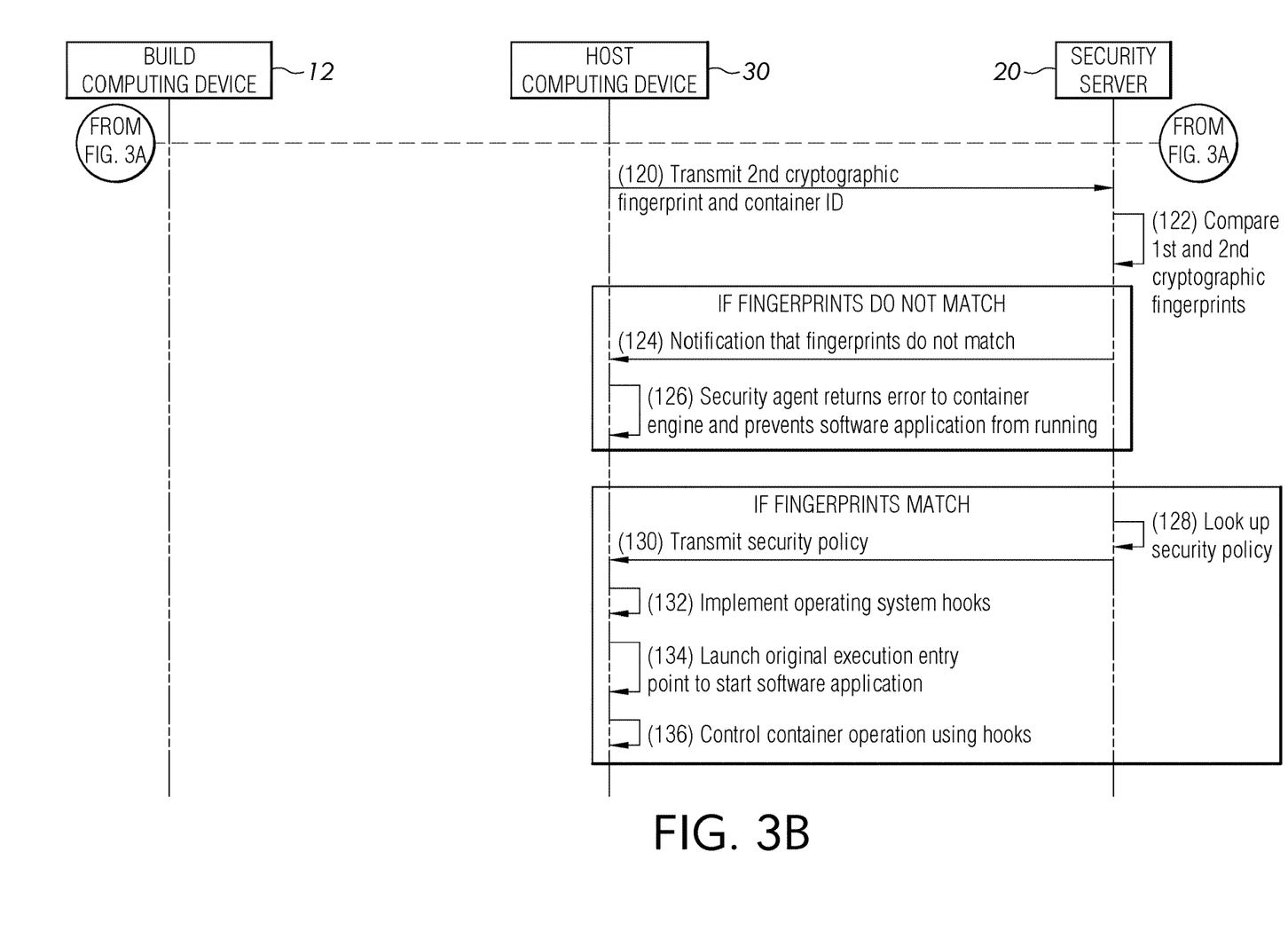

FIGS. 3A-B are representative of an example computer-implemented method 100 of operating the system 10 of FIG. 1 of which different portions are implemented by different ones of the build computing device 12, security server 20, and host computing device 30. FIGS. 3A-B will be discussed below with reference to items in FIG. 1 and FIGS. 2A-B.

The build computing device 12 creates or obtains a software container image 14A that includes the software application 16 in one or more lower layers 82. The software container image 14A also includes a manifest 84 that describes the contents of the software container image 14A.

The build computing device 12 scans the one or more lower layers 82 of the software container image 14A based on the manifest, and creates a unique first cryptographic fingerprint for the one or more lower layers 82 based on their content (step 101). The cryptographic fingerprint tracks and ensures the integrity and identify of the lower layer(s) 82 throughout their lifecycle. The cryptographic finger print is a digital fingerprint, and in some examples is based on a hash function.

The build computing device 12 encrypts the one or more lower layers 82 of the software container image 14A using a cryptographic key 40 (step 102), and generates an encrypted software container image 14B that replaces the lower layer(s) with their corresponding encrypted layer(s) (step 103).

The build computing device 12 embeds the security agent 18 within the encrypted software container image 14B (step 104). In one example, the embedding of the security agent 18 corresponds to adding the security agent layer 86 that includes the security agent 18 to the software container image 14B as an additional entry in its manifest 84.

In one example, the same plurality of lower layers 82 that are used for determining the first cryptographic fingerprint are encrypted. In another example, a different plurality of lower layers 82 are encrypted than are used for determining the cryptographic fingerprint (e.g., encrypting less layers than are used to determine the first cryptographic fingerprint).

As part of the embedding of step 104, the security agent 18 is configured with an identifier (ID) of the software container image 14B. The ID could be mapped to one or any combination of the following, for example: an owner of the software container image 14, a user name, a timestamp (e.g., of the embedding), a creator of the software container image 14, etc.

Although only one software application 16 is shown in the encrypted software container image 14B in FIG. 1, the software container image 14B may include a plurality of software applications 16, each present in separate layers 82, for example. The software container image 14B may also include one or more lower layers 82 that are non-application layers (e.g., file libraries for supporting runtime operation of the software application 16).

The software container image 14A has an execution entry point that tells the container engine 32 what file to launch when the software container image 14A is instantiated. The build computing device 12 replaces an initial execution entry point of the software container image 14A that would have launched the software application 16 upon instantiation of the software container image 14A with a modified execution entry point that instead launches the security agent 18 upon instantiation of the encrypted software container image 14B (step 106). Steps 101-106 correspond to a "build phase." The analysis of the software container image's software package inventory during the build phase serves as a baseline for a subsequent vulnerability assessment.

The build computing device 12 transmits the first cryptographic fingerprint, the container ID of the software container image 14, and a security policy for the software container image 14B to the security server 20 in one or more transmissions (step 108). The security server 20 stores the cryptographic fingerprint in a cryptographic fingerprint repository 22, and stores the security polity in a security policy repository 26 (step 112).

The build computing device 12 deploys the encrypted software container image 14B and a decryption key to the host computing device 30 (step 114). In one example, the encrypted software container image 14B and decryption key are transmitted at different times. In one example, the decryption key is provided from a device other than the build computing device 12. The container engine 32 of the host computing device 30 instantiates the software container image 14B as one of its instantiated software containers 34A-N.

The container engine 32 runs on top of an operating system 36 of the host computing device 30. The container engine 32 creates environments for the software applications 16A-N within their respective containers 34, and also controls an operational state of the containers 34 (e.g., whether they are running or stopped, or being imported) and also controls preserving a state of the containers (e.g., container saving and exporting). One example container engine 32 is part of the DOCKER platform, for example.

Upon receiving a request to instantiate the encrypted software container image 14B as a container 34, the container engine 32 launches the execution entry point of the software container image 14, which has been modified in step 106 to launch the security agent 18 (step 116).

The security agent 18 uses a cryptographic key provided by a user and/or stored in a predefined location on the host computing device 30 (e.g., in repository 42) to decrypt the encrypted lower layer(s) 82 of the encrypted software container image 14B (step 117).

The security agent 18 authenticates the contents of the software container image 14B by scanning the content of the decrypted layers 82 of the software container image 14B based on its manifest, and creating a second cryptographic fingerprint for the software container image 14B based on the content (step 118). In some examples, the security agent 18 excludes its own security agent layer 86 from the scanning of the second fingerprint creation.

The host computing device 30 transmits the second cryptographic fingerprint to the security server 20 for comparison against the preexisting first cryptographic fingerprint stored in the cryptographic fingerprint repository 22, along with the container ID of the software container image 14B (step 120). Thus, the first cryptographic fingerprint is received during a first time period, and the second cryptographic fingerprint is received during a subsequent second time period, which may be days, weeks, or months later than the first time period in some examples.

In the example of FIGS. 3A-B, the security server 20 performs an authentication by comparing the two cryptographic fingerprints, and the security agent 18 on the host computing device 30 performs an authentication through its transmittal of the second cryptographic fingerprint, and its receipt of a response from the security server 20 indicating the results of the comparison.

The security server 20 compares the second cryptographic fingerprint to the first cryptographic fingerprint to determine if they match (step 122). To "match," the cryptographic fingerprints indicate that the lower layer(s) 82 being authenticated are the same as the lower layer(s) 82 of the original software container image 14B (e.g., aside from encryption/decryption). If the fingerprints do not match, the security server 20 determines that the lower layer(s) 82 at the time of authentication differ from the lower layer(s) of the original software container image 14A, and provides a notification to the security agent 18 running on the host computing device 30 that the authentication of the software container image 14B has failed (step 124). Based on this notification, the security agent 18 returns an error to the container engine 32 and prevents the software application 16 from running (step 126). In one example, the security agent 18 instructs the container engine 32 to shut down the instantiated container 34 based on the failed authentication. Thus, the security agent 18 controls whether the software application 16 is launched based on the authentication.

Conversely, if the cryptographic fingerprints do match, the security server 20 looks up the security policy for the software container image 14B from the security policy repository 26 (step 128), and transmits the security policy to the security agent 18 (step 130). This message, or a separate message, serves as a notification that the encrypted software container image 14B is authenticated.

The lookup of the security policy is based on the container ID of the software container image 14, and in some examples is further based on an application type of the application 16 within the software container image 14B. In one example, if a specific security policy has not been provided for the software container image 14B, the security server 20 determines an application type of the software application 16 and selects a default security policy for the application type. In such examples, the container ID of the software container image 14 is mapped to an application type at the security server 20 (e.g., web server application type, database application type, etc.). In one example, the security server 20 further bases its identification of a default security policy based on a version of the software application 16 in the software container image 14.

As an example of how application type affects security policy, consider that a default profile for a database application container may differ from a logging application container. In one example, a database container may only need inbound network connections, and may have multiple inbound connections querying it, but no outbound connections. A logging container on the other hand may, in one example, require an outbound network connection to send logs to external security event management or analytics solution.

The security agent 18 controls operation of the software application 16 from within the instantiated software container 34. The security agent 18 implements operating system hooks into the operating system 36 that intercept requests from the software application 16 (step 132). Once the operating system hooks are implemented, the security agent 18 launches the original execution entry point of the software container image 14B, which launches the software application 16 (step 134). The security agent 18 controls container operations using the hooks, by intercepting requests of the software application 16, and controlling whether those requests are granted based on the security policy for the container 34 (step 136).

In one example, the operating system hooks are configured to detect one or more of: file system access requested by the software application 16, processes requested by the software application 16, and network access requested by the software application 16.

In one example, the operating system hooks include low-level hooks that are implemented into the operating system 36 at the kernel level, which allows the security agent 18 to catch low-level system calls before they are executed by the kernel. Such hooks may be implemented through techniques such as kernel module proxying, system call replacement, process instrumentation, and the like. An example file system hook in the WINDOWS operating system is "minifilter," and an example networking hook in the LINUX operating system is "netfilter," for example.

If the software application 16 requests an access that violates the security policy, the security agent 18 blocks the requested access and transmits a security notification to the security server 20, which maintains a log of security notifications for the software application 16 in the audit log repository 24.

Figure 4:
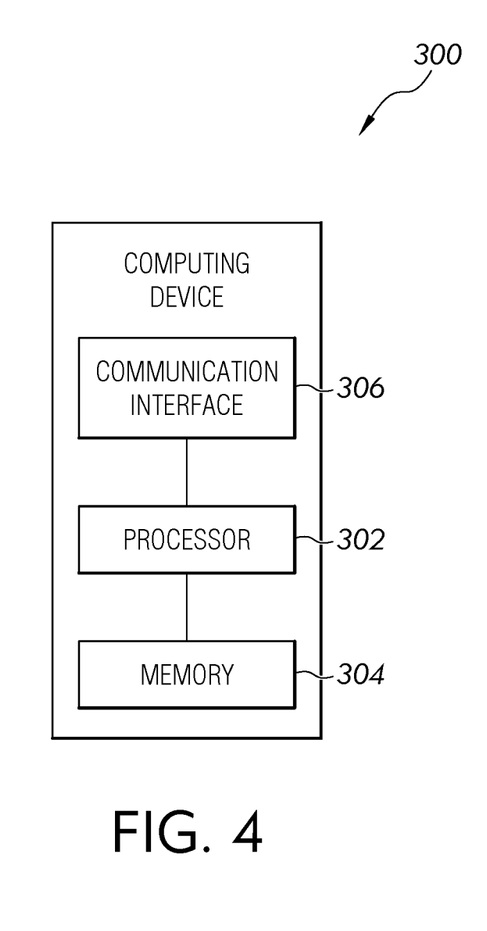
FIG. 4 schematically illustrates an example computing device.

FIG. 4 schematically illustrates a computing device 300 that may be utilized as any of the build computing device 12, security server 20, and host computing device 30. The computing device 300 includes a processor 302 that is operatively connected to memory 304 and a communication interface 306.

The processor 302 includes processing circuitry to carry out steps of method 100 (e.g., all steps of the build computing device 12, all steps of the security server 20, or all steps of the host computing device 30). The processor 302 may include one or more microprocessors, microcontrollers, application specific integrated circuits (ASICs), or the like, for example.

The memory 304 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 304 may incorporate electronic, magnetic, optical, and/or other types of storage media. The memory 304 can also have a distributed architecture, where various components are situated remotely from one another, but can be accessed by the processor 302.

In one example of the build computing device 12, the memory 304 stores program instructions that facilitate the embedding of the security agent 18 within the software container image 14, and stores the cryptographic key 40.

In one example the security server 20, the memory 304 stores program instructions for comparing and storing cryptographic fingerprints, looking up security policies, and accessing each of the cryptographic fingerprint repository 22, audit log repository 24, and security policy repository 26. The memory 304 may also store the cryptographic fingerprint repository 22, audit log repository 24, and security policy repository 26.

In one example of the host computing device 30, the memory 304 stores program instructions for operating the container engine 32 and security agent 18, and stores the cryptographic key repository 42.

The communication interface 306 is configured to facilitate communication with other computing devices (e.g., if the communication interface 306 includes a networking interface) and/or with user input devices (e.g., if the communication interface 306 includes a wired or wireless interface for receiving and/or providing user input).

In one example, the build computing device 12 and the host computing device 30 are the same device. In other examples, they are separate devices. Also, in one example the security policy is provided to the security server 20 by a device other than the build computing device 12.

Although different examples have specific components shown in the illustrations, embodiments of the present disclosure are not limited to those particular combinations. It is possible to use some of the components or features from one of the examples in combination with features or components from another one of the examples.

Also, it is possible that certain ones of the steps above could be performed in a different order or by a different device. For example, the first cryptographic fingerprint could be determined based on the encrypted lower layer(s) 82 of the encrypted software container image 14B instead of the unencrypted lower layer(s) 82 of the software container image 14A. Also, the first cryptographic fingerprint could be determined based on the lower layer(s) 82 and the embedded security agent layer 86 in one example. Also, the comparison of the first and second cryptographic fingerprints could be performed by the host computing device 30 instead of the security server 20 in one example.

Also, although a number of example embodiments have been disclosed, a worker of ordinary skill in this art would recognize that certain modifications would come within the scope of this disclosure. For that reason, the following claims should be studied to determine the true scope and content of this disclosure.

What is claimed is:

1. A computer-implemented method of providing security for a software container, comprising:
    a first computing device receiving a request to instantiate a software container image as a software container, the software container image having a container ID, the software container image including a software application layer that is encrypted and includes a software application, and a separate security agent layer that includes a security agent;
    based on the request, the first computing device utilizing the security agent to decrypt the software application layer, create a second cryptographic fingerprint based on the decrypted software application layer, and transmit the second cryptographic fingerprint and the container ID to a security server which is separate from the first computing device;

the security server receiving a first cryptographic fingerprint during a first time period occurring prior to the request, and receiving the second cryptographic fingerprint during a second time period that is subsequent to the first time period;

the security server comparing the second cryptographic fingerprint to the first cryptographic fingerprint;

based on the comparing indicating that the first and second cryptographic fingerprints match, the security server determining a security policy for the software application based on the container ID and an application type of the software application, and transmitting an indication of the security policy to the first computing device;

based on the indication, the first computing device utilizing the security agent and the security policy to control runtime operation of the software application.

2. The computer-implemented method of claim 1, comprising:

based on the first and second cryptographic fingerprints not matching, the security server transmitting a notification that the first and second cryptographic fingerprints do not match to the first computing device; and the first computing device utilizing the security agent to prevent launch of the software application in response thereto.

3. The computer-implemented method of claim 2, wherein the first computing device utilizing the security agent to control runtime operation of the software application comprises the first computing device:

implementing operating system hooks that are configured to intercept requests from the software application, wherein the operating system hooks are implemented prior to the first computing device launching the software application; and controlling, from within the software container, whether intercepted requests of the software application are granted based on the security policy.

4. The computer-implemented method of claim 3, wherein the operating system hooks are configured to detect one or more of:

file system access requested by the software application;
processes requested by the software application; and
network access requested by the software application.

5. The computer-implemented method of claim 3, wherein the indication of the security policy includes the security policy, the method comprising:

the first computing device transmitting a security notification from the security agent to the security server based on the software application attempting an action that violates the security policy; and the security server maintaining a log of security notifications received for the software application.

6. The computer-implemented method of claim 1, comprising:

the security server selecting a default security policy of the application type for the software application based on a specific security policy for the software application not being accessible by the security server.

7. A system comprising:
a security server; and
a first computing device comprising a first processor and configured to:

receive a request to instantiate a software container image as a software container, the software container image having a container ID, the software container image including a software application layer that is encrypted and includes a software application, and a separate security agent layer that includes a security agent; and based on the request, utilizing the security agent to decrypt the software application layer, create a second cryptographic fingerprint based on the decrypted software application layer, and transmit the second cryptographic fingerprint and the container ID to a security server which is separate from the first computing device;

wherein the security server is configured to:

receive a first cryptographic fingerprint during a first time period occurring prior to the request, and receive the second cryptographic fingerprint during a second time period that is subsequent to the first time period;

compare the second cryptographic fingerprint to the first cryptographic fingerprint; and based on the comparison indicating that the first and second cryptographic signatures match, determine a security policy for the software application based on the container ID and an application type of the software application, and transmit an indication of the security policy to the first computing device;

the first computing device configured to, based on the indication, utilize the security agent and the security policy to control runtime operation of the software application.

8. The system of claim 7, wherein:

the security server is configured to, based on the first and second cryptographic signatures not matching, transmit an notification that the first and second cryptographic signatures do not match to the first computing device; and the first computing device is configured to utilize the security agent to prevent launch of the software application in response thereto.

9. The system of claim 8, wherein to control runtime operation of the software application, the first computing device is configured to operate the security agent to:

implement operating system hooks that intercept requests from the software application, wherein the operating system hooks are implemented prior to launch of the software application; and control, from within the software container, whether intercepted requests of the software application are granted based on the security policy.

10. The system of claim 9, wherein the operating system hooks are configured to detect one or more of:

file system access requested by the software application;
processes requested by the software application; and
network access requested by the software application.

11. The system device of claim 8, wherein the security server is configured to:

select a default security policy of the application type for the software application based on a specific security policy for the software application not being accessible by the security server.

* * * * *